(12) United States Patent
Matama

(10) Patent No.: US 6,700,685 B1
(45) Date of Patent: Mar. 2, 2004

(54) IMAGE PROCESSING APPARATUS

(75) Inventor: Toru Matama, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/337,491

(22) Filed: Jun. 22, 1999

(30) Foreign Application Priority Data

Jun. 22, 1998 (JP) .......................................... 10-174653

(51) Int. Cl.$^7$ ........................... H04N 1/40; G03B 27/72
(52) U.S. Cl. ...................... 358/487; 358/487; 358/447; 355/80
(58) Field of Search ............................... 358/1.15, 709, 358/1.13, 1.11, 487, 447; 355/80

(56) References Cited

U.S. PATENT DOCUMENTS

| | | | | |
|---|---|---|---|---|
| 4,001,495 A | * | 1/1977 | Tauszig | 358/477 |
| 4,229,099 A | * | 10/1980 | Watkins | 355/71 |
| 4,580,167 A | * | 4/1986 | Diete | 355/20 |
| 5,012,333 A | * | 4/1991 | Lee et al. | 358/80 |
| 5,218,350 A | * | 6/1993 | Bollman | 340/723 |
| 5,818,975 A | * | 10/1998 | Goodwin et al. | 382/274 |
| 6,285,834 B1 | * | 9/2001 | Hylen | 396/544 |

OTHER PUBLICATIONS

U.S. patent application Ser. No. 08/873,032, filed Jun. 11, 1997.
U.S. patent application Ser. No. 08/741,722, filed Oct. 31, 1996
U.S. patent application Ser. No. 08/943,597, filed Oct. 3, 1997.
U.S. patent application Ser. No. 09/327,952, filed Jun. 8, 1999.
U.S. patent application Ser. No. 09/327,954, filed Jun. 8, 1999.
U.S. patent application Ser. No. 09/156,399, filed Sep. 18, 1998.
U.S. patent application Ser. No. 09/266,937, filed Mar. 12, 1999.
U.S. patent application Ser. No. 09/209,751, filed Dec. 11, 1998.
U.S. patent application Ser. No. 09/150,010, filed Sep. 9, 1998.
U.S. patent application Ser. No. 09/276,831, filed Mar. 26, 1999.

* cited by examiner

Primary Examiner—Kimberly Williams
Assistant Examiner—Saeid Ebrahimi
(74) Attorney, Agent, or Firm—Birch, Stewart, Kolasch & Birch, LLP

(57) ABSTRACT

The image processing apparatus receives image data from an image data supply source and coverts the image date into output image data by subjecting the image data to image processing. The apparatus includes an instructing device for interactively instructing a region from an image of one frame, and at least two of a first dodging processing device for applying automatic dodging processing to an entire image of the one frame (first mode), a second dodging processing device for applying the automatic dodging processing only to the instructed region (second mode) and a third dodging processing device for applying the automatic dodging processing to the instructed region and to the regions other than the instructed region in different intensity (third mode). The apparatus can switch optionally or automatically the above first, second and third modes and interactively designate the region to which the dodging processing is applied or the region to which the dodging processing is applied in the different intensity. Accordingly, the image processing apparatus can simply apply the dodging processing and the dodging processing having high intensity only to the designated region, whereby finished prints to which gradation processing is more appropriately applied can be obtained.

16 Claims, 9 Drawing Sheets

IMAGE PROCESSING APPARATUS

BACKGROUND OF THE INVENTION

The present invention relates to an image processing apparatus for receiving image data from an image supply source, subjecting the image data to image processing and outputting the processed image data as output image data.

The images recorded on photographic films such as negatives and reversals (which are hereinafter referred to as "films") have been printed onto light-sensitive materials (photographic papers) by a technique generally called "direct exposure" (analog exposure) in which the image on a film is projected onto the light-sensitive material for areal exposure.

In contrast, a printer which adopts digital exposure so called a digital photoprinter has been recently commercialized. In this digital photoprinter, the image recorded on a film is read photoelectrically; the thus read image is converted into digital signals; the digital signals are subjected to various kinds of image processing to produce the output image data for recording; and a light-sensitive material is scanned and exposed with recording light modulated in accordance with the image data, thereby an image (latent image) is recorded on the light-sensitive material and output as a (finished) print (photograph).

In digital photoprinters, the image is converted into digital image data and exposing conditions used in print operation can be determined by processing that image data. Hence, high quality prints which cannot be heretofore obtained by the conventional direct exposure can be obtained by preferably executing, by means of such digital photoprinters, a correction of washed-out highlight of images and dull shadow of images due to photography with backlight or an electronic flash, sharpness processing, a correction of color failure and density failure, a correction of under- or overexposure, a correction of a insufficiency of marginal lumination, and various other kinds of image processing. In addition, a plurality of images can be composited into a single image or one image can be split into segments or even characters can be composited by the processing of image data. If desired, prints can be output after desired editing/processing is carried out in accordance with a specific application.

The capability of digital photoprinters is by no means limited to outputting the image as a print and they enable the image data to be supplied to computers and the like or stored in recording mediums such as floppy disks and so forth; thus, with digital photoprinters, the image data can be used in various applications other than photography.

Having these features, the digital photoprinter is composed of the following three basic components; a scanner (image reading apparatus) which photoelectrically reads the image recorded on a film; an image processing apparatus which subjects the read image data to image processing and outputs it as recording image data (exposure conditions); and a printer (image recording apparatus) which scans and exposes a light-sensitive material according to the image data and subjects the exposed light-sensitive material to development processing and outputs the light-sensitive material as prints.

In the scanner, the reading light issuing from a illuminant is allowed to be incident on the film, thereby producing projected light that carries the image recorded on the film; the projected light is then passed through an imaging lens to be focused on an image sensor such as a CCD sensor which performs photoelectric conversion to read the image, which is optionally subjected to various kinds of image processing before it is sent to the image processing apparatus as the image data (image data signals) from the film.

In the image processing apparatus, the image processing conditions are set on the basis of the image data which has been read with the scanner and image processing is performed on the image data in accordance with the thus set conditions, thereby producing output image data for image recording (i.e., exposing conditions) which are subsequently sent to the printer.

In the printer, if it is an apparatus which adopts exposure by scanning with optical beams, the optical beams are modulated in accordance with the image data supplied from the image processing apparatus, a latent image is formed by two-dimensionally scanning and exposing (printing) a light-sensitive material, and then the exposed light-sensitive material is subjected to predetermined development processing and the like so as to output a print on which the image which has been recorded on the film is reproduced.

Incidentally, images are recorded on a film under various conditions, and there are many cases in which a large difference exists between highlight images and shadow portion images (densities) as found in an image recorded with an electric flash or rear light, that is, there are many cases in which images have a greatly wide dynamic range.

When the images recorded on the film are exposed in an ordinary manner and prints are made therefrom, there is a case in which highlight images may be washed out and shadow images may be dulled. For example, when a person is photographed with rear light, if exposure is executed so that the person is reproduced as a preferable image, a highlight image such as a sky is washed out to white, in contrast if the exposure is executed so that the sky is reproduced as a preferable image, the person is dulled.

To cope with this problem, when a light-sensitive material is exposed using a film image, which has a large difference between highlight images and shadow images, as an original, a method referred to as so-called dodging is employed.

Dodging is a technique for obtaining a print on which appropriate images, which are near to an impression a person gets when he or she observes an original scene, are reproduced over the entire image of the print by correcting the large difference between the highlight images and the shadow images of the images recorded on the film. Dodging processing is carried out by ordinarily exposing the portion having an intermediate density, exposing the highlight portion, in which images are liable to be washed out, with an increased quantity of light (exposure) and exposing the shadow portion, in which images are liable to be dulled, with a reduced quantity of light (exposure).

In the conventional apparatus employing the direct exposure, the dodging processing has been carried out by a method of executing exposure by inserting a shading plate, an ND filter or the like into an exposure light path; a method of partly changing the quantity of light of an exposure light source; a method of making a monochrome film in which the highlight portion and the shadow portion of the images recorded on a film are reversed and executing exposure in the state that the monochrome film is placed on the above film, and the like, so that the quantity of exposure light is partly changed in accordance with the images recorded on the film.

Whereas, in the digital photoprinter, the dodging processing is carried out by compressing the dynamic range of images in image data processing so that highlight images and shadow images can be preferably reproduced, whereby images, which are near to an impression of when a person observes an original scene, can be reproduced. That is, an image histogram of image data is created over the entire images and the washed-out images of the highlight portions and the dull images of the shadow portions are removed by compressing a low frequency component to thereby realize an abundant gradation representation of the images.

When it is intended to correct the gradation of, for example, a wedding dress which is liable to be washed out in analog exposure, an operator conventionally prevents the occurrence of the washing-out to white by dodging or strongly printing only the region of the wedding dress. In this method, however, there is a problem that the operator is required to have a skilled technique and a job is very troublesome.

Further, digital exposure also has a problem that it is impossible to apply the dodging processing only to a particular region of images and to control the gradation of only the region, although it is possible, in the dodging processing which is applied to the entire images described above, to create an image histogram and to set optimum conditions such as the compression of a highlight side dynamic range, the compression of a shadow side dynamic range and the like for each image.

Intrinsically, a region where it is desired to apply the dodging processing is different depending upon, for example, a scene, the intention of a photographer, and the sensitivity of the operator who finishes a photograph.

Fairly satisfactorily finished prints can be obtained in the field of amateur photographs by the dodging processing applied to entire images. However, the dodging processing applied to the entire image is not always sufficient in the photographic field of professionals and so-called "advanced amateurs" who are particularly interested in finishing conditions.

SUMMARY OF THE INVENTION

An object of the present invention, which was made in view of the above conventional problems, is to provide an image processing apparatus which has a mode for applying dodging processing to entire images, a mode for applying the dodging processing only to a designated region, a mode for applying the dodging processing to a designated region and to the regions other than the designated region in different intensity, and the like and which can carry out the dodging processing to the entire images, only to the designated region or only to the designated region in the different intensity after the apparatus interactively designates the region to which the dodging processing is applied or the region to which the dodging processing is applied in the different intensity by optionally or automatically switching the above modes.

In order to attain the above-described object, the first aspect of the present invention provides an image processing apparatus for receiving image data from an image data supply source and converting the image data into output image data by subjecting the image data to image processing, comprises:

first dodging processing means for applying automatic dodging processing to an entire image of one frame;
means for interactively instructing a region from an image of said one frame; and
second dodging processing means for applying the automatic dodging processing only to the instructed region.

In the first aspect, it is preferable that said first dodging processing means applies said automatic dodging processing in uniform intensity.

It is also preferable that the image processing apparatus includes, as an automatic dodging processing mode, a mode in which the automatic dodging processing is applied to the entire images by said first dodging processing means and a mode in which the automatic dodging processing is applied only to the instructed region by said second dodging processing means, the mode in which the automatic dodging processing is applied to the entire images is set as a basic mode, and the image processing apparatus further comprises switching means for switching the modes from the basic mode to the mode in which the automatic dodging processing is applied only to the instructed region.

It is further preferable that the automatic dodging processing compresses a dynamic range of the image by compressing a low frequency component of the image data of a region to be processed and said first and second dodging processing means have means for compressing the low frequency component commonly used in both of said first and second dodging processing means.

It is also further preferable that said first dodging processing means has first compressing means for compressing a low frequency component of the image data of the entire image to apply the automatic dodging processing, second dodging processing means has second compressing means for compressing the low frequency component by weighting the low frequency component with an signal for instructing the region due to said instructing means and said first and second compressing means are commonly used.

It is still further preferable that an signal for instructing the regions can be input externally by said instructing means.

The second aspect of the resent invention provides an image processing apparatus for receiving image data from an image data supply source and converting the image data into output image data by subjecting the image data to image processing, comprising:

first dodging processing means for applying automatic dodging processing to an entire image of one frame;
means for interactively instructing a region from an image of said one frame; and
third dodging processing means for applying the automatic dodging processing to the instructed region and to the regions other than the instructed region in different intensity.

In the second aspect, it is preferable that said first dodging processing means applies said automatic dodging processing in uniform intensity.

It is also preferable that the image processing apparatus includes, as an automatic dodging mode, a mode in which the automatic dodging processing is applied to the entire images in uniform intensity by said first dodging processing means and a mode in which the automatic dodging processing is applied to the instructed region and to the regions other than the instructed region in different intensity by said third dodging processing means, the mode in which the automatic dodging processing is applied to the entire images is set as a basic mode, and the image processing apparatus further comprises switching means for executing switching from the basic mode to the mode in which the dodging processing is applied to the instructed region and to the regions other than the instructed region in different intensity.

It is further preferable that the automatic dodging processing compresses a dynamic range of the image by compressing a low frequency component of the image data of a region to be processed and said first and third dodging processing means have means for compressing the low frequency component commonly used in both of said first and third dodging processing means.

It is still further preferable that an signal for instructing the regions can be input externally by said instructing means.

The third aspect of the present invention provides an image processing apparatus for receiving image data from an image data supply source and converting the image data into output image data by subjecting the image data to image processing, comprising:

first dodging processing means for applying automatic dodging processing to an entire image of one frame;

means for interactively instructing a region from an image of said one frame;

second dodging processing means for applying the automatic dodging processing only to the instructed region; and third dodging processing means for applying the automatic dodging processing to the instructed region and to the regions other than the instructed region in different intensity.

In the third aspect, it is preferable that said first dodging processing means applies said automatic dodging processing in uniform intensity.

It is also preferable that the image processing apparatus includes, as an automatic dodging processing mode, a mode in which the automatic dodging processing is applied to the entire image in uniform intensity by said first dodging processing means, a mode in which the automatic dodging processing is applied only to the instructed region by said second dodging processing means and a mode in which the automatic dodging processing is applied to the instructed region and to the regions other than the instructed region in different intensity by said third dodging processing means, the mode in which the automatic dodging processing is applied to the entire image is set as a basic mode, and the image processing apparatus further comprises switching means for switching the modes from the basic mode to any of the mode in which the automatic dodging processing is applied only to the instructed region and the mode in which the automatic dodging processing is applied to the instructed region and to the regions other than the instructed region in different intensity.

It is further preferable that the automatic dodging processing compresses a dynamic range of the image by compressing a low frequency component of the image data of a region to be processed and said first, second and third dodging processing means have means for compressing the low frequency component is commonly used in said first, second and third dodging processing means.

It is still further preferable that wherein an signal for instructing the regions can be input externally by said instructing means.

DETAILED DESCRIPTION OF THE INVENTION

An image processing apparatus of the present invention will be described below in detail with reference to the preferable embodiment shown in the accompanying drawings.

Figure 1:
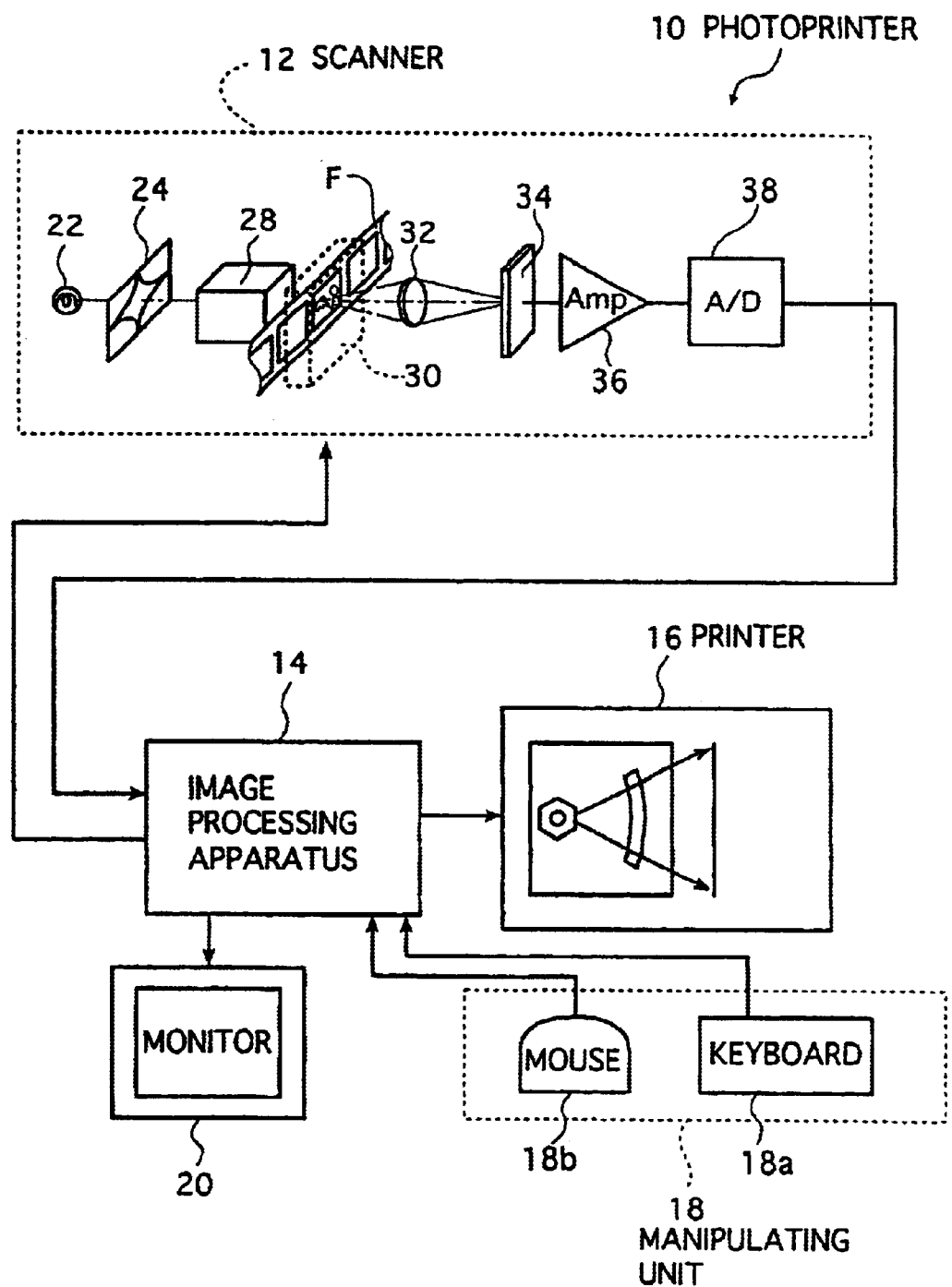
FIG. 1 is a block diagram schematically showing an embodiment of a digital photoprinter to which an image processing apparatus of the present invention is applied.

FIG. 1 shows a block diagram of an example of a digital photoprinter which makes use of the image processing apparatus according to the present invention.

The digital photoprinter generally indicated by 10 in FIG. 1 (hereinafter, simply referred to as the "photoprinter") basically comprises: a scanner (image reading apparatus) 12 which reads the image recorded on a film F photoelectrically; an image processing apparatus 14 which carries out image processing of the thus read image data (image information), and which performs manipulation, control and otherwise of the photoprinter 10 in its entirety; and a printer 16 which exposes a light-sensitive material (photograph paper) imagewise with optical beams modulated in accordance with the image data supplied from the image processing apparatus 14, develops the light-sensitive material and outputs it as a (finished) print.

Connected to the image processing apparatus 14 are a manipulating unit 18 having a keyboard 18a and a mouse 18b to enter (set) various conditions, to select processing steps, to instruct a region to which dodging processing is applied and to enter commands for color/density correction and the like, as well as a monitor 20 which displays the image read with the scanner 12, various kinds of manipulative instructions, and screens on which various conditions are set and/or registered.

The scanner 12 is an apparatus for reading the image recorded on the film F or the like photoelectrically frame by frame. It comprises an illuminant 22, a variable stop 24, a diffuser box 28 with which the reading light incident on the film F is made uniform on the plane of the film F, an imaging lens unit 32, an image sensor 34 which has line CCD sensors corresponding to the reading of respective R (red), G (green) and B (blue) images, an amplifier 36, and an A/D (analog to digital) converter 38.

The photoprinter 10 has dedicated carriers 30 available which can be selectively mounted on the housing of the scanner 12 depending upon such factors as the type and size of films, for example, films for an Advanced Photo System and negatives (or reversals) of 135 size, the physical form of the films, e.g. whether they are a strip or a slide. By replacing carriers 30, the photoprinter 10 is capable of handling and processing various kinds of films. An image (frame) used to create a print is transported to a predetermined reading position by the carrier 30.

In the scanner 12 arranged as described above, when the image recorded on the film F is read, light emitted from the illuminant 22 is adjusted in quantity through the variable stop 24 as a reading light, then is incident on the film F which is held at the predetermined reading position by a carrier 30, through which it is transmitted to produce projected light which carries the image recorded on the film F.

Figure 2A:
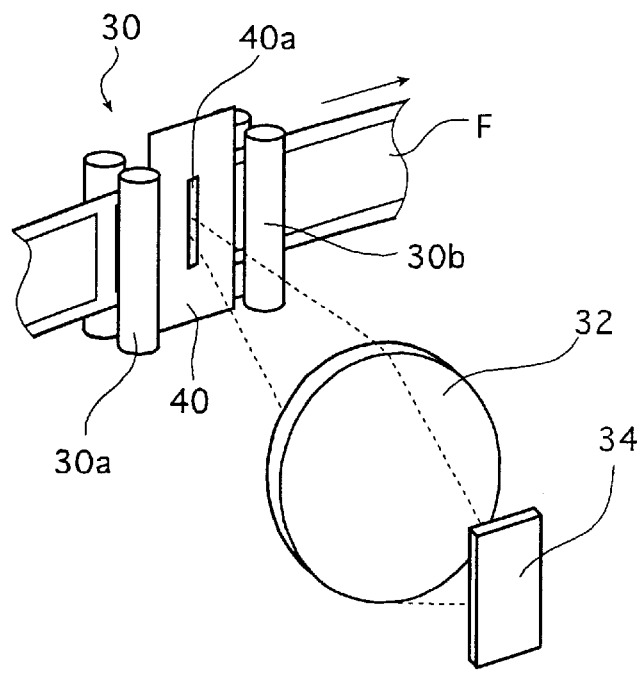
FIG. 2A is a schematic perspective view explaining an embodiment of a carrier which is mounted on the digital photoprinter shown in FIG. 1

As schematically shown in FIG. 2A, the carrier 30 of the illustrated example, which corresponds to the film F (cartridge) of the Advanced Photo System, includes transport rollers pairs 30a and 30b and a mask 40 having a slit 40a. The transport rollers pairs 30a and 30b are disposed on the opposite sides of the predetermined reading position in an auxiliary scanning direction. They transport the film F with its lengthwise direction being parallel to the auxiliary scanning direction (a direction shown as an arrow in FIG. 2A) which is perpendicular to a direction in which the line CCD sensors of the image sensor 34 extend (main scanning direction) while holding the film F at the predetermined reading position. The slit 40a of the mask 40 defines the light projected from the film F so that the light has a predetermined slit shape and is located in registry with the reading position, and extends in the main scanning direction.

Being held at the reading position by the carrier 30, the film F is illuminated with the reading light which is incident thereon while transported in the auxiliary scanning direction. Consequently, the film F is subjected to two-dimensional slit scan with the reading light through the slit 40a extending in the main scanning direction, whereupon the image of each frame recorded on the film F is read.

As known well, a magnetic recording medium is formed to the film of the Advanced Photo System and various kinds of information are previously recorded to the magnetic recording medium. Further, various kinds of information are recorded to the magnetic recording medium by a camera, a developing device and the carrier 30 and read when necessary.

As described above, the reading light passes through the film F held by the carrier 30 and is made to the projected light which carries the image recorded on the film F. The projected light is processed with the imaging lens unit 32 and forms a focused image on the light receiving plane of the image sensor 34.

Figure 2B:
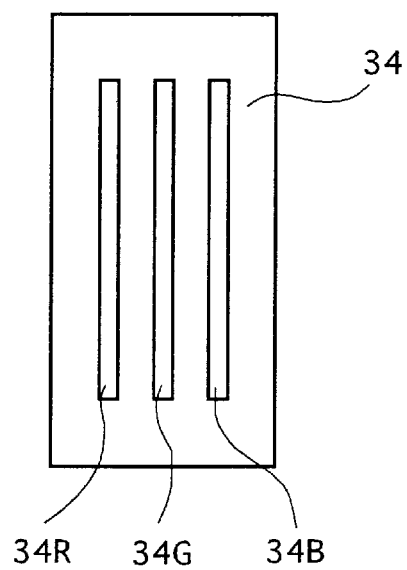
FIG. 2B is a schematic view of an embodiment of an image sensor of the digital photoprinter shown in FIG. 1 likewise.

As shown in FIG. 2B, the image sensor 34 is a so-called 3-line color CCD sensor comprising a line CCD sensor 34R for reading R image, a line CCD sensor 34G for reading G image, and a line CCD sensor 34B for reading B image. The respective line CCD sensors extend in the main scanning direction as described above. The light projected from the film F is separated into the three primary colors R, G and B by means of the image sensor 34 and read photoelectrically.

The signals output from the image sensor 34 are amplified with the amplifier 36, converted into digital signals with the A/D converter 38 and thereafter sent to the image processing apparatus 14.

The scanner 12 reads the image recorded on the film F twice. That is, the scanner 12 carries out prescan for reading the image at a low resolution and fine scan for obtaining the image data of an output image.

The prescan is carried out under predetermined prescan reading conditions to read the images of the entire film F to be read with the scanner 12 so that the image sensor 34 can read the images without being saturated. In contrast, the fine scan is carried out under fine scan reading conditions which are set to each frame from prescan data so that the image sensor 34 is saturated at a density which is a little lower than the minimum density of each image (frame).

Therefore, the signals output in the prescan and the signals output in the fine scan are basically the same data except that they have a different resolution and a different output level.

It should be noted that the scanner 12 which constitutes the image input apparatus of the present invention is by no means limited to a type that relies upon the slit scan described above but that it may make use of areal exposure by which the entire surface of the image in one frame is read at a time.

In this case, an area CCD sensor, for example, is used, a means for inserting R, G and B color filters is interposed between the illuminant 24 and the film F, and the image recorded on the film F is sequentially read with the area CCD sensor by inserting the R, G and B color filters so that the image is separated into the three primary colors.

As described above, the digital signals output from the scanner 12 are supplied to the image processing apparatus 14.

Figure 3:
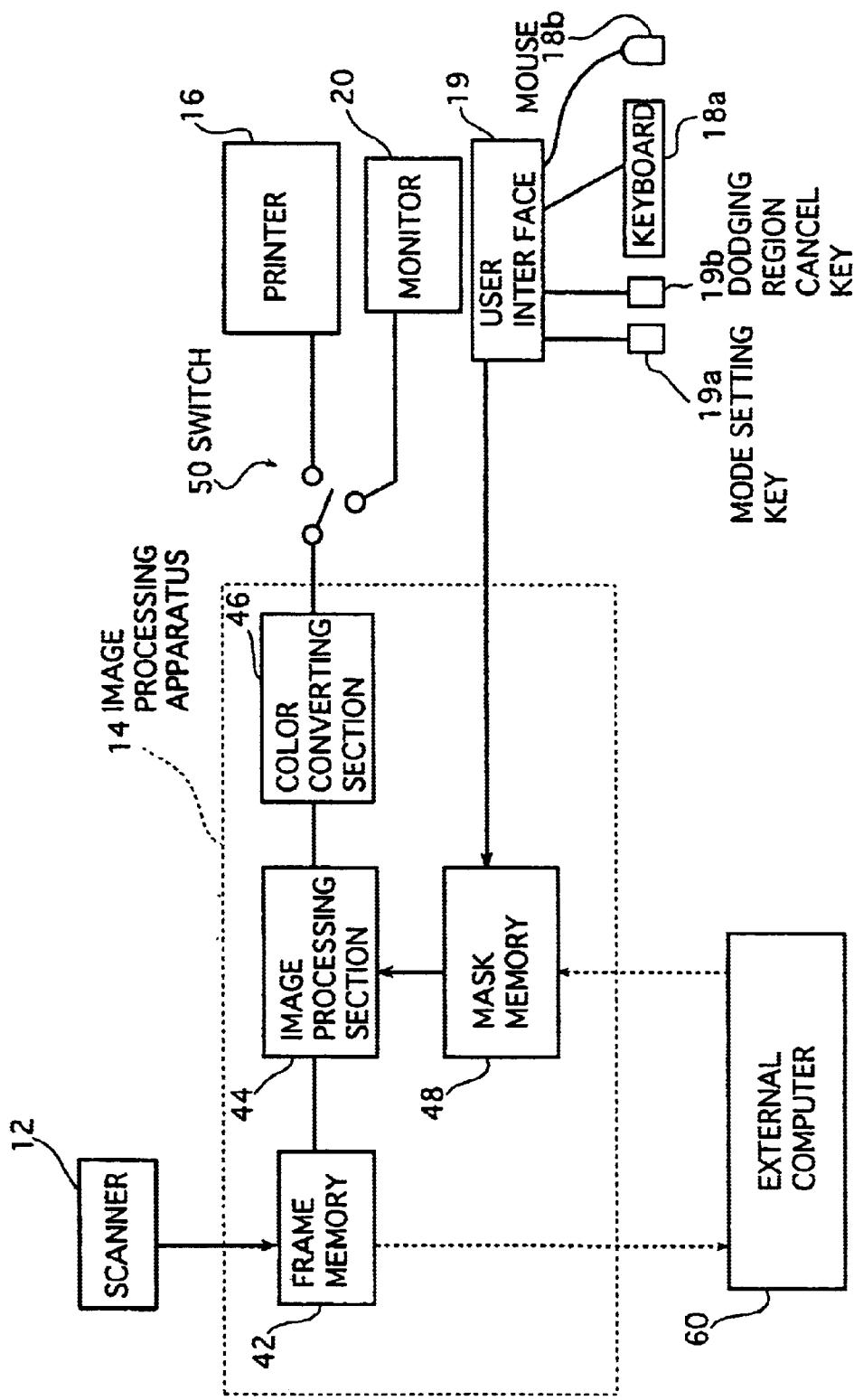
FIG. 3 is a block diagram schematically showing the image processing apparatus of FIG. 1.

FIG. 3 shows the block diagram of the image processing apparatus 14.

As shown in FIG. 3, the image processing apparatus 14 comprises a frame memory 42, an image processing section (hereinafter, simply referred to as "processing section") 44, a color converting section 46 and a mask memory 48.

The figure mainly shows only the components which are related to image processing. However, the image processing apparatus 14 carries out the management and the like of the digital photoprinter 10 in its entirety in addition to the image processing, and includes a memory in which data necessary to operate the digital photoprinter 10 as a whole is stored, a device for determining the stop value of the variable stop 24 in the fine scan, and the like in addition to the illustrated components. The manipulating unit 18, the monitor 20 and the printer 16 are connected to the respective components through a not shown CPU (CPU bus).

The monitor 20 is basically used to display image data (prescanned data) obtained in the prescan after it is subjected to image processing. The operator executes verification while observing the display on the monitor 20. Further, the operator designates, through the monitor 20, a region to which dodging processing by processing image data (automatic dodging, hereinafter, simply referred to as "dodging processing") is applied.

The image processing apparatus 14 is selectively connected to the printer 16 and the monitor 20 by a switch 50. In a verification job, the image processing apparatus 14 is connected to the monitor 20 which displays a verification picture plane. The operator verifies an image while observing the verification picture plane, designates a region to which the dodging processing is applied, and instructs the change of other image processing conditions. When the verification job is finished and prints are output, the image processing apparatus 14 is connected to the printer 16.

The keyboard 18a, the mouse 18b, a mode setting key 19a, a dodging region cancel key 19b and the like are connected to the monitor 20 through a user interface 19. The mode setting key 19a sets whether entire images are subjected to the dodging processing (mode 1) or only a designated region is subjected to the dodging processing (mode 2). The dodging region cancel key 19b cancels the dodging processing designated once.

The frame memory 42 stores (contains) the prescanned data and the fine scanned data which have been read with the scanner 12. That is, the frame memory 42 stores or contains the image density data of each of R, G and B colors in one entire frame of the film F after it is read with the scanner 12 and subjected to various kinds of data correction and Log conversion processing. In the embodiment, the frame memory 42 is not particularly limited. It may have a capacity capable of storing the image density data of one frame and processes frames one by one or it may be composed of a multiplicity of memories each having a capacity for one frame and used as, for example, a toggle memory.

The processing section 44 is a site where predetermined image processing is carried out as well as where the dodging processing is applied to an entire image, or to a designated region or designated regions. The color converting section 46 is a site where color conversion is applied to image data having been subjected to image processing in accordance with an object from which images are output such as the printer 16 or the monitor 20.

In the verification job, the processing section 44 applies image processing such as the dodging processing and the like to the prescanned data in accordance with an instruction and redisplays the image data having been subjected to the image processing on the monitor 20 through the color converting section 46. The operator continues the verification job while observing the display on the monitor 20.

When the verification job is finished and the image processing conditions are established, the switch 50 is toggled to connect the printer 16 to the image processing apparatus 14. Then, the fine scanned data is subjected to image processing in the processing section 44 under the established image processing conditions and the printer 16 outputs finished prints.

The mask memory 48 is a site where mask image data, which is created when a region to which the dodging processing is applied is designated, is stored. The operator interactively designates the region to which the dodging processing is applied through the keyboard 18a while observing the monitor 20. A region to which the dodging processing is applied is designated in two modes. In a mode 1, the dodging processing is applied to an entire image, and 1 is set to all the mask image data MASK (x, y). In a mode 2, the dodging processing is applied only to a designated region. The operator interactively instructs the region to which the dodging processing is applied while observing the monitor 20, and 1 is set to the mask image data MASK (x, y) of the instructed region. The result of instruction is stored as mask image data which has a bit depth 1 bit with 1 set to the portion to which the dodging processing is applied and 0 set to the portion to which the dodging processing is not applied.

In the embodiment, a specific method of designating a region to which the dodging processing is applied is not particularly limited. Exemplified as the method are a method of permitting the operator to instruct one point in a region and to designate the region from the continuity of color and the like using the mouse 18b or the like, a method of permitting the operator to cut out a region using the mouse 18b, a method of automatically extracting a region using a known region extracting algorithm, and the like.

Exemplified as the automatic region extraction method is, for example, a method of previously evaluating a plurality of different region extraction methods and determining weights for the region extraction methods; extracting regions by the respective region extraction methods and weighting the extracted regions with the determined weights; and determining and extracting a region based on the result of the above processes as disclosed in Japanese Unexamined Patent Publication No. 9-138470. The plurality of different methods include the method of extracting a specific color, a method of extracting a pattern having a specific shape, a method of removing a region which is supposed to correspond to a background, and the like. Preferably used, in addition to the above region extracting methods, are the region extracting methods which are disclosed in Japanese Unexamined Patent Publications Nos. 4-346333, 5-158164, 5-165120, 6-160993, 8-184925, 9-101579, 9-138471 and the like.

As shown in the figure, it should be note that the frame memory 42 and the mask memory 48 may be connected to an external personal computer (hereinafter, simply referred to as "computer") 60, the image data in the frame memory 42 may be transferred to the external computer 60, and a region to which the dodging processing is applied (a region to which the dodging processing is intensively applied in the mode 3 to be described later) may be designated on by the computer 60. In this case, the dodging processing is carried out by returning only (the image date of) the designated portion to the image processing apparatus 14.

When a region is designated on the computer 60, commercially available software, for example, "Photoshop" manufactured and sold by Adobe Systems, Inc., Mountain View, Calif. and the like may be used. The use of the software has an advantage that time and manpower necessary to develop region designating software can be omitted.

Figure 4:
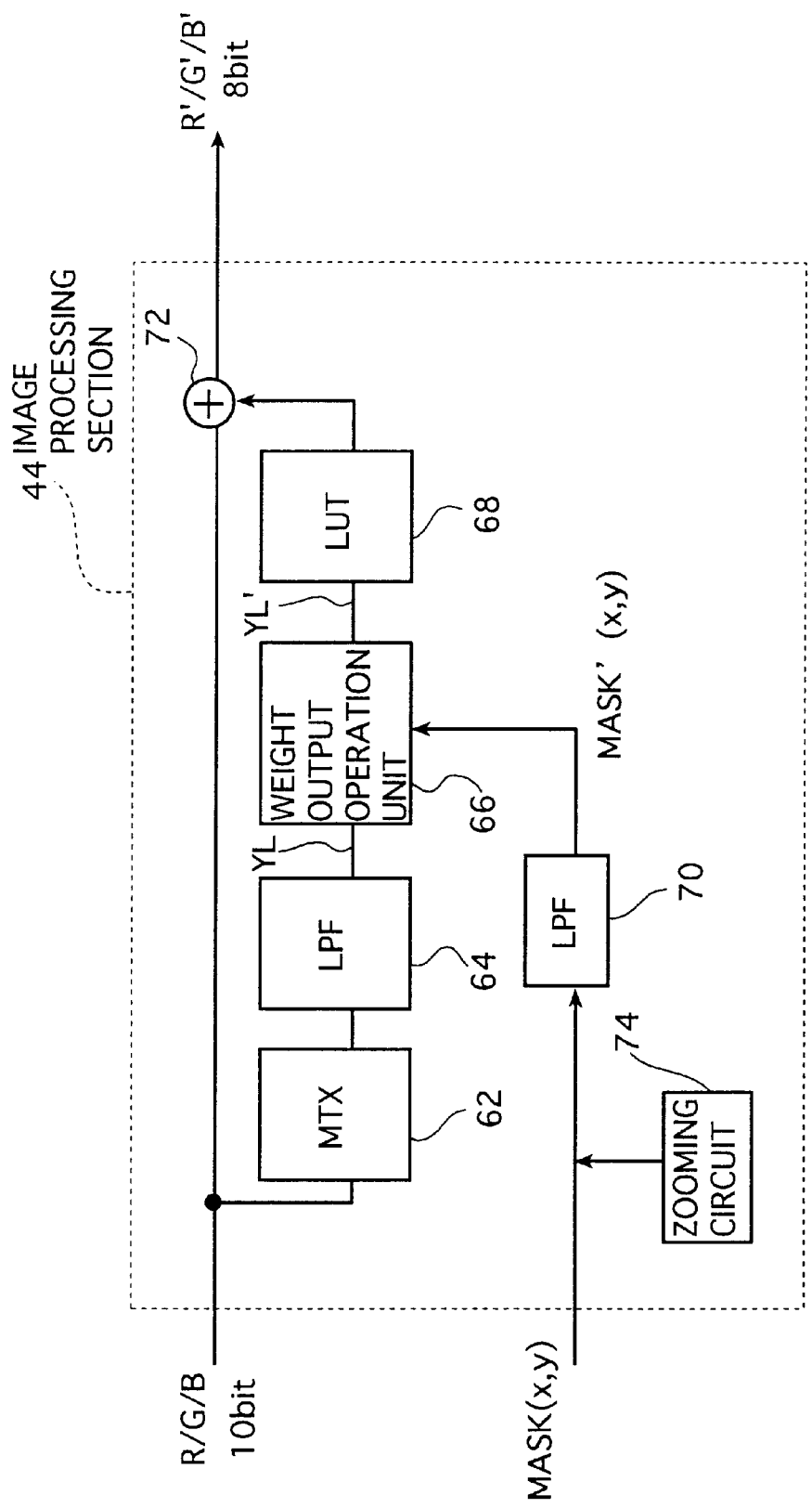
FIG. 4 is a block diagram schematically showing an image processing section of FIG. 3.

FIG. 4 shows the schematic arrangement of only the portion of the processing section 44 which is used in the dodging processing.

As shown in FIG. 4, the processing section 44 comprises a matrix operation unit (MTX) 62, a low-pass filter LPF 64, a weight output operation unit 66, a look-up table LUT 68, a low-pass filter LPF 70 and an adding unit 72.

The matrix operation unit (MTX) 62 creates luminance image data, which is a luminance signal for carrying out the dodging processing, from 10-bit three R/G/B color signals supplied from the frame memory 42. A method of calculating the mean value of R, B and G image data (⅓ of the sum of the respective values), a method of converting color image data into the luminance image data using the YIQ base, and the like are exemplified as the method of creating the luminance image data.

Exemplified as the method of obtaining the luminance image data using the YIQ base is, for example, a method of calculating only the Y component of the YIQ base from the R, G and B image data using the following formula.

$$Y = 0.3R + 0.59G + 0.11B$$

The low-pass filter LPF 64 makes luminance images unsharp two-dimensionally and obtains the unsharp image data YL of the read images by processing the luminance image data and extracting a low frequency component from it. A FIR (Finite Impulse Response) type low-pass filter, which is ordinarily used to create unsharp images, may be used as the low-pass filter LPF 64. However, it is preferable to use an IIR (Infinite Impulse Response) type low-pass filter because the unsharp image data YL, in which images are made greatly unsharp, can be created with a small circuit.

The weight output operation unit 66 carries out weighting operation to the unsharp image data YL and to mask image data MASK' (x, y) and calculates weighted unsharp image data YL'.

The mask image data MASK' (x, y) is obtained by making the edge of the mask image data MASK (x, y), which was sent from the mask memory 48, slightly unsharp through the low-pass filter LPF 70. The weighting operation described above is carried out by the following formula.

$$YL'=\text{MASK}'(x, y) \times YL + \{1-\text{MASK}'(x, y)\} \times Y0$$

where, Y0 is a predetermined value which will be described later. A reason why the border of the mask image MASK (x, y) is made unsharp through the low-pass filter LPF 70 is to prevent the border from being conspicuous in a finished print because the border of the mask image violently changes in the state as it is.

Figure 5:
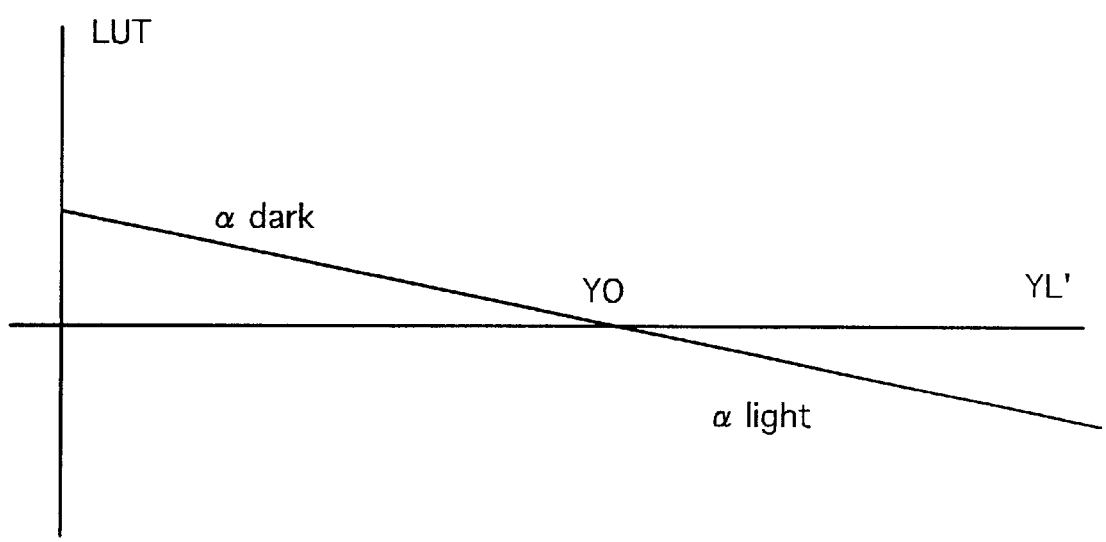
FIG. 5 is a graph showing a look-up table of FIG. 4.

The look-up table LUT 68 subjects the weighted unsharp image data YL' to compression processing. The table shown in FIG. 5 is set as the look-up table LUT 68.

The image data compressed by the look-up table LUT 68 is added to the image data R/G/B by the adding unit 72 and 8-bit output image data is obtained, whereby a dogging effect can be obtained.

Further, when the mask image data MASK' (x, y) is weighted by the above formula, the portion in which the MASK portion is set to 1 (portion to which the dodging processing is applied) is weighted by the unsharp image signals YL, whereas the portion in which the MASK portion is set to 0 (portion to which the dodging processing is not applied) is weighted by the predetermined value Y0. As apparent from FIG. 5, the dodging processing is not applied to the portion which is weighted by the predetermined value Y0, and as a result, the dodging processing is not applied to the portion other than the designated region (MASK (x, y)=1).

When the dodging processing is applied to entire images, since MASK (x, y)=1 is set to the entire region and no edge exists, the mask image data MASK' (x, y)=1 is established. Therefore, the unsharp image signals YL are not changed even by the weight output operation unit 66 and YL=YL' is established. So, when the dodging processing is applied to the entire images in the mode 1, the dodging processing is carried out by subjecting the low frequency component YL, which was obtained by the low-pass filter LPF 64, to the compression processing by the look-up table LUT 68.

As described above, compression can be carried out by the common compression device (look-up table LUT 68) when entire images are subjected to the dodging processing (mode 1) as well as when only a designated region is subjected to the dodging processing (mode 2).

When a region is designated by the manipulating unit 18 such as the keyboard 18a and the like, the region can be designated using the prescanned data as described above. However, when it is intended to designate a region on the external computer 60, the fine scanned data is displayed on the monitor of the external computer 60 after it is somewhat thinned out and the region is designated to the displayed fine scanned data and a mask image is created. This is because that the prescanned data cannot be displayed well on the monitor of the external computer 60 due to the low resolution of it.

Therefore, when prints are output, it is preferable to dispose a zooming circuit 74 forward of the low-pass filter LPF 70 as shown in FIG. 4 to match the resolution of the mask image with that of the fine scanned data.

Figure 6:
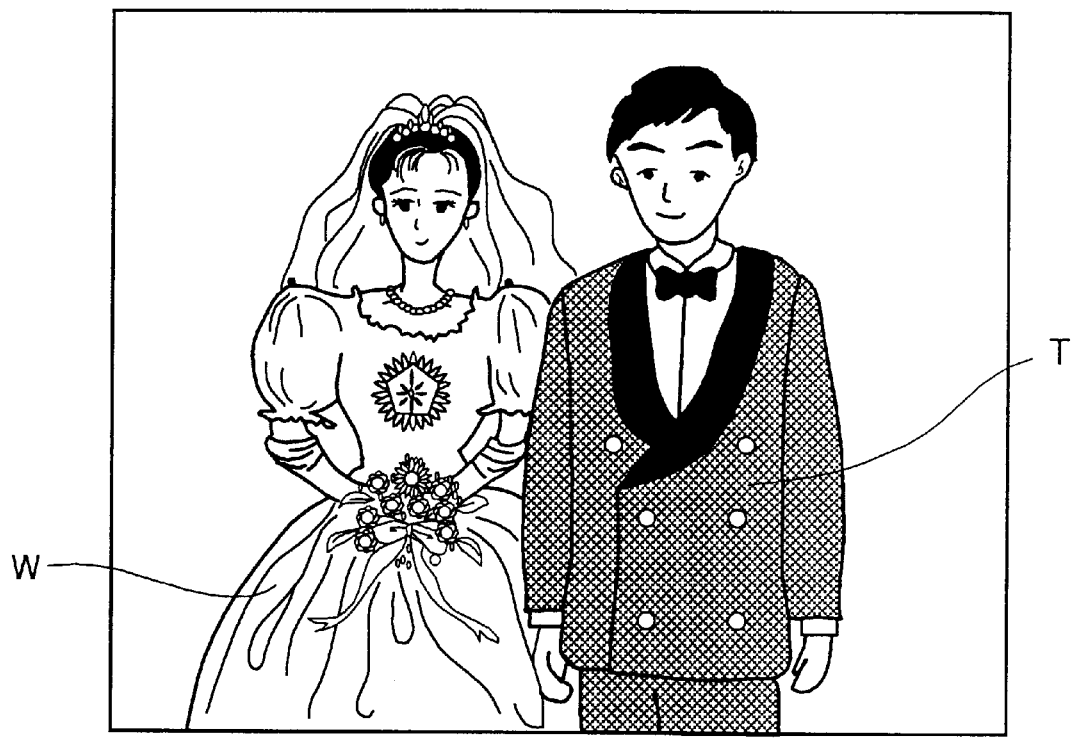
FIG. 6 is a view explaining an example of images used in the embodiment.

The operation of the embodiment will be specifically described below using the image processing of the photograph of a wedding as shown in FIG. 6 as an example.

In the example shown in FIG. 6, the white of a wedding dress W is washed out and the black of a tuxedo T is dulled in many cases.

Figure 7:
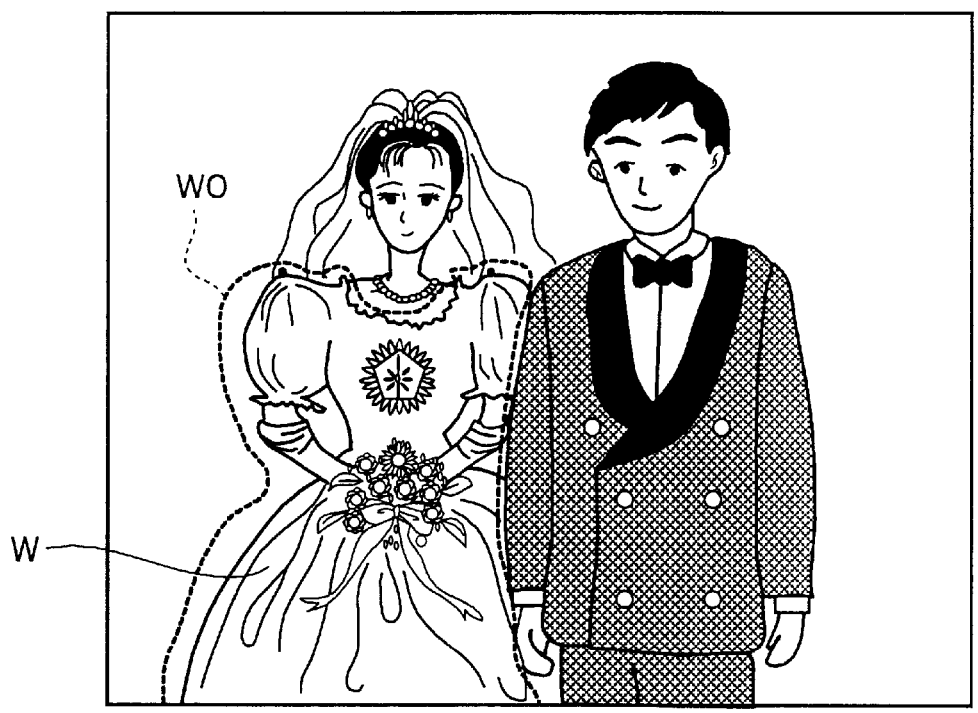
FIG. 7 is a view explaining how a region to which dodging is applied is designated in the image shown in FIG. 6.
Figure 8:
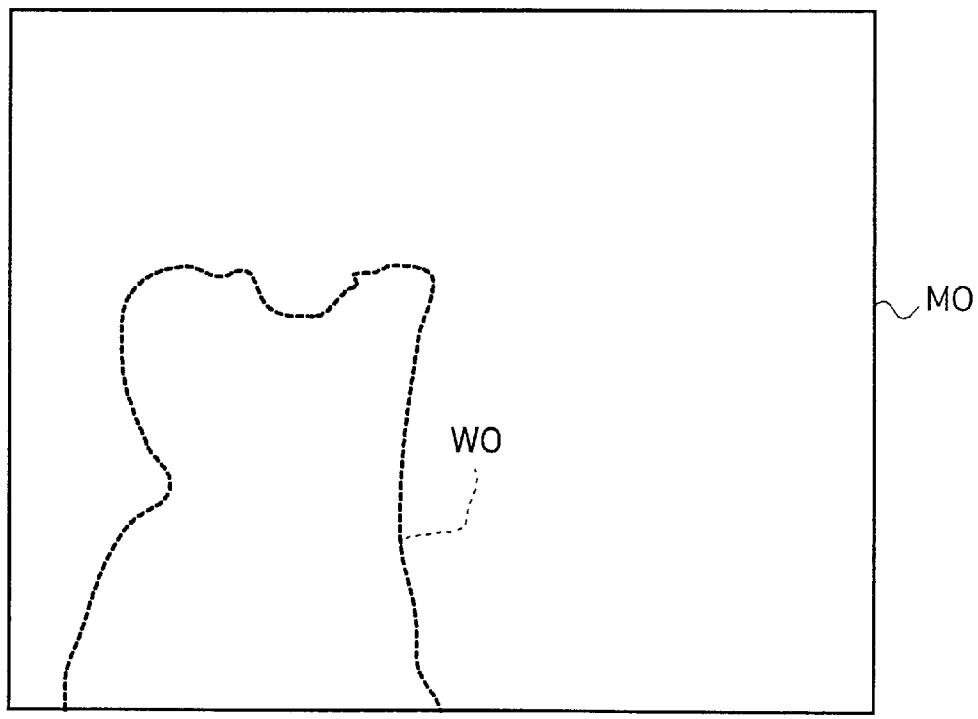
FIG. 8 is a view explaining a mask image of the region designated in FIG. 7.

To cope with this problem, image data, which was obtained in prescan, is displayed on the monitor 20 and verified. To restore the washed-out white of the wedding dress W, the operator first selects the mode 2, in which the dodging processing is applied only to a designated region, through the mode setting key 19a, then roughly surrounds the white region W0 of the wedding dress W using the mouse 18b as shown in FIG. 7. With this operation, a mask image M0, in which the region W0 is designated, is obtained as shown in FIG. 8.

Figure 9:
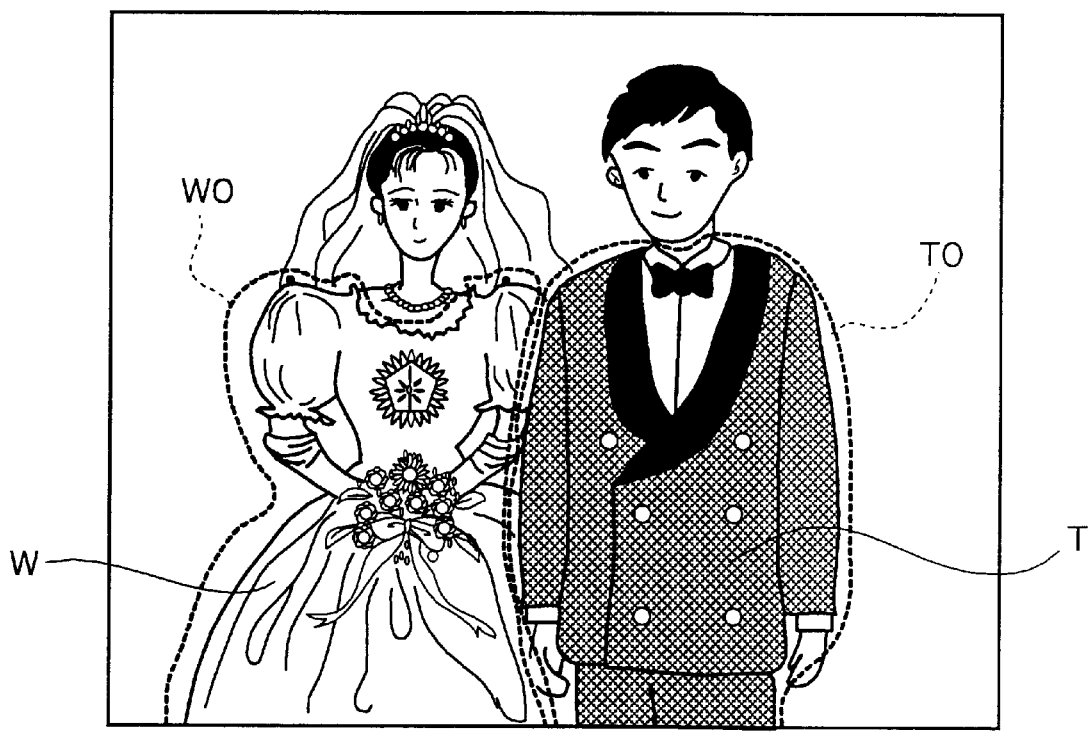
FIG. 9 is a view explaining how a region to which the dodging is applied is additionally designated in FIG. 7.

Next, as shown in FIG. 9, the operator roughly surrounds the region T0 of the tuxedo T with the mouse 18b to prevent the black of the tuxedo T from being dulled.

Figure 10:
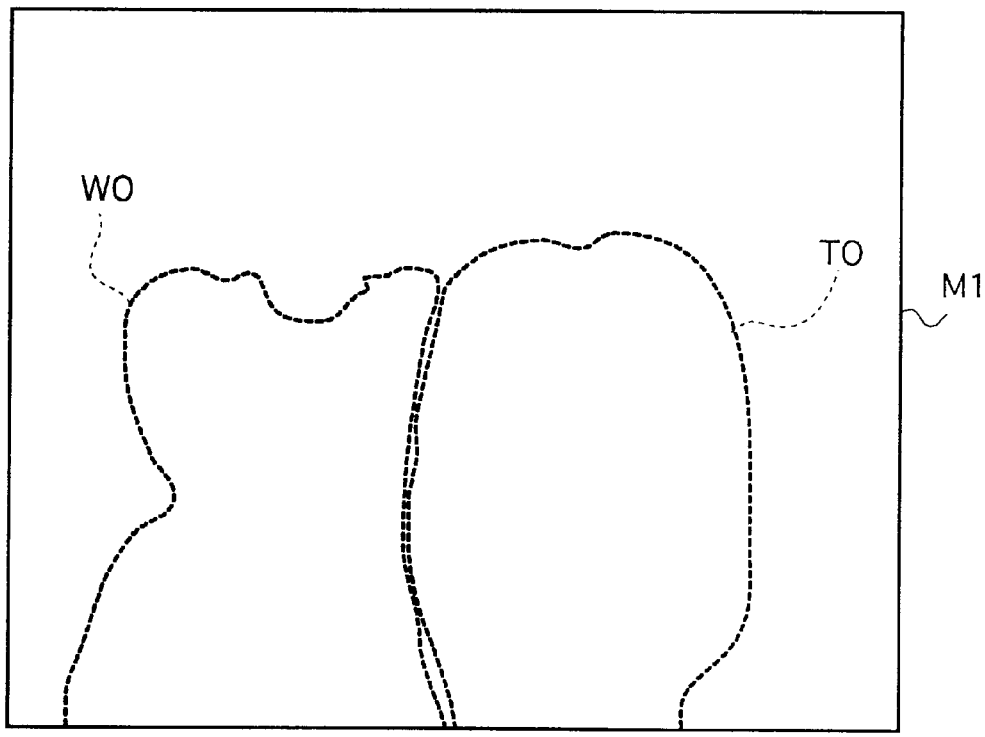
FIG. 10 is a explaining a mask image of the region designated in FIG. 9.

As a result, a mask image M1, in which the black region T0 of the tuxedo T is also designated in addition to the white region W0 of the wedding dress W, is obtained as shown in FIG. 10.

In the mask image data MASK (x, y) representing the mask image M1 shown in FIG. 10, 1 is set to the regions W0 and T0 and 0 is set to the other regions.

The low-pass filter LPF 70 carries out processing for making boundaries somewhat unsharp to the mask image data to thereby create a mask image data MASK' (x, y). The mask image data MASK' (x, y) is supplied to the weight output operation unit 66 and weighted image data YL' is obtained. The weighted image data YL' is compressed in the look-up table LUT 68, added to the original image data R/G/B in the adding unit 72 and subjected to the dodging processing.

The prescanned data, which has been subjected to the image processing, is displayed on the monitor 20. The operator determines whether the image processing is acceptable or not while observing the prescanned data displayed on the monitor 20.

While both the white of the wedding dress W and the black of the tuxedo T are designated at this time, when the operator determines, for example, that any one of them is not necessary by observing the displayed screen, he or she instructs the cancel of it through the dodging region cancel key 19b. Then, the displayed image is returned to the previous image in which the dodging processing is applied to any one of the regions. As described above, image processing conditions are fixed by interactively designating a region, to which the dodging processing is applied, or other image processing conditions.

When the image processing conditions are finally fixed, the processing section 44 applies the same processing as that applied to the aforesaid prescanned image data to the fine scanned data under the fixed image processing conditions. The fine scanned data, which has been subjected to the image processing, is subjected to color conversion in the color converting section 46 so that it is matched with the output format of the printer 16.

Then, the switch 50 is toggled to connect the printer 16 to the image processing apparatus 14, and the converted image data is sent to the printer 16 and output therefrom as finished prints.

This embodiment is provided with the two modes, that is, the mode 1 in which entire images are subjected to the dodging processing and the mode 2 in which only a designated region is subjected to the dodging processing as described above. However, there can be also contemplated a processing method other than the above. For example, when a wedding cake is located in front of the bride and bridegroom in the images shown in FIG. 6 and is not appropriately finished due to the designation of the above regions regardless of that the wedding cake could be appropriately finished by an ordinary dodging processing, it may be designated to more intensively apply the dodging processing to the wedding cake.

Next, a modification of the embodiment will be described to cope with the above problem. The modification includes a mode 3, in addition to the mode 1 in which the dodging processing is applied to entire images and the mode 2 in which the dodging processing is applied only to a designated region. In the mode 3, the dodging processing is further applied to a designated region after it is applied to entire images.

Figure 11:
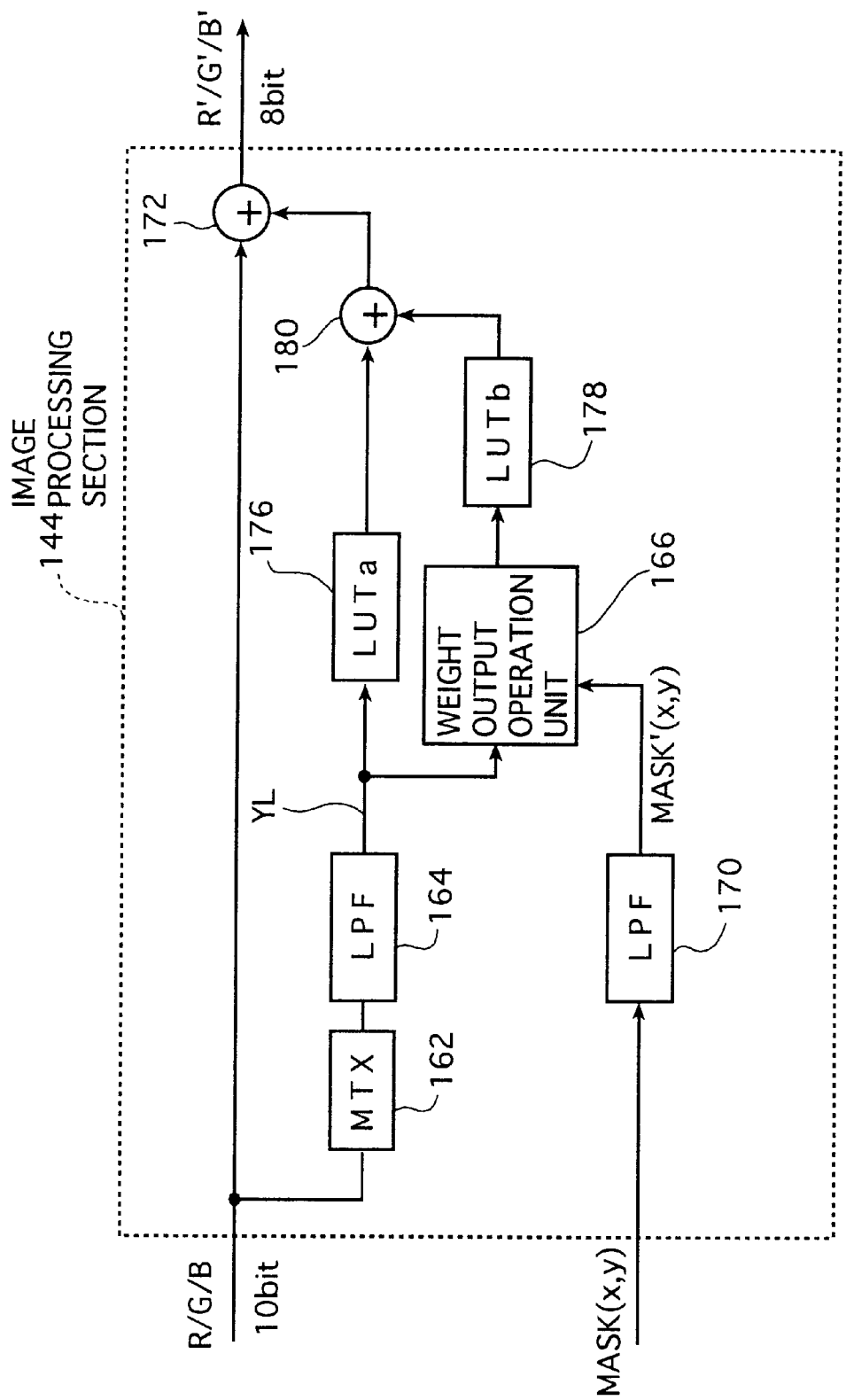
FIG. 11 is a view showing the schematic arrangement of a processing section according to a modification of the embodiment.

An image processing apparatus for embodying the modification of the embodiment, to which the mode 3 is added, can be obtained by replacing the processing section 44 in the aforesaid embodiment with a processing section 144 shown in FIG. 11.

FIG. 11 is a block diagram showing the schematic arrangement of the processing section 144 according to the modification of the embodiment.

The processing section 144 is different from the processing section 44 of the above embodiment shown in FIG. 4 in that it is provided with two look-up tables (LUTa 176 and LUTb 178) and an adding unit 180 for adding the outputs from these look-up tables instead of the look-up table LUT 68. The look-up table LUTa 176 compresses the unsharp image data YL created by a low-pass filter 164 and applies the dodging processing to entire images. Further, the look-up table LUTb 178 compresses the unsharp image data YL created by the low-pass filter 164 to the image data weighted by a weight output operation unit 166 to thereby apply the dodging processing only to a designated region.

In the mode 1 in which the dodging processing of uniform intensity is applied to entire images, only the look-up table LUTa 176 is available (enabled) and the outputs from the look-up table LUTb 178 is set to 0 at the time.

In the mode 2 in which the dodging processing is applied only to a designated region, only the look-up table LUTb 178 is available and the outputs from the look-up table LUTa 176 is set to 0 at the time.

Further, in the mode 3, both the two look-up tables LUTa 176 and LUTb 178 are available and the outputs from the respective look-up tables are added by the adding unit 180, whereby the dodging processing is applied to entire images and further it is also applied to a designated region.

Since the elements of the processing section 114, other than the above elements, are the same as those of the processing section 44 shown in FIG. 4, the numerals having the same lower two digits are used to denote the same elements, that is, a matrix operation unit MTX 162, the low-pass filter LPF 164, the weight output operation unit 166, a low-pass filter LPF 170 and an adder 172 are the same elements as the matrix operation unit MTX 62, the low-pass filter LPF 64, the weight output operation unit 66, the low-pass filter 70 and the adder 72, respectively, and the detailed description of them is omitted.

For example, in the scene of wedding as shown in FIG. 6, when the operator contemplates that it is better to further apply the dodging processing to the wedding cake located in front of the bride and bridegroom by observing a verification picture plane although the operator intended to apply the dodging processing to entire images by designating the mode 1, images of higher quality can be reproduced by further applying the dodging processing to the wedding cake by designating the mode 3.

The form shown in FIG. 4 includes the mode 1 in which the dodging processing is applied to entire images and the mode 2 in which the dodging processing is applied only to a designated region, and the modes 1 and 2 can be switched. Whereas, the form shown in FIG. 11 includes the mode 3 in which the dodging processing is applied to entire images as well as the dodging processing (having high intensity) is further applied only to a designated region, in addition to the mode 1 and the mode 2, and the modes 1, 2 and 3 can be switched. However, the present invention is not limited thereto and may has only the mode 1 and the mode 3 which can be switched or may have only the mode 2 and the mode 3 which can be switched.

In the image processing apparatus of the present invention, the switching of the respective modes is not limited to the method effected by the switching device such as the mode setting key 19a and the like in response to the instruction from the operator, and an optimum mode may be automatically selected by analyzing images by the image processing apparatus.

As an image analyzing method, histogram analysis of the image is effective. For example, if a histogram has a shape comprising two peaks, two important subjects are present and, moreover, the ratio of luminance of these subjects are large so that it is in many cases preferable that the intensity of dodging processing is changed according to different areas whereupon the mode 3 which differentiates the intensity of dodging processing between inside and outside of the designated regions is automatically selected.

When the modes are selected using the switching device such as the mode setting key 19a and the like, the operator may select and designate a mode for each predetermined unit such as each frame or each single film.

It is preferable that the mode 1 is used as a basic mode (default) and the dodging processing is carried out in the mode 1 unless otherwise instructed by the operator; and that the dodging processing is carried out in the mode 2 or the mode 3 only when the operator switches the mode 1 to the mode 2, the mode 3 or any of the mode 2 and the mode 3 using the switching means.

Further, the image processing apparatus of the present invention may include at least two of the automatic selection of the modes executed by the image processing apparatus, the selection of the modes executed by the operator and the switching of mode from the basic mode executed by the operator, select them and execute image processing in accordance with each of the selected ones.

The dodging processing which designates the region as in the mode 2 and mode 3 is difficult to operate unless the operator is skilled in the art to some extent so that, if the operator is not fully skilled in the art, the mode 1 may be fixed which performs a uniform dodging processing across the picture plane on the screen as a whole whereas, if the operator is sufficiently skilled in the art, the mode 2 or the mode 3 which designates the region may be arranged as selectable.

Moreover, when the customer orders a high quality finishing print or a large-sized enlargement print, the mode 2 or the mode 3 may be selected to obtain the print of high quality.

Furthermore, when the film kind can be judged and the film is a negative film for professional use or a reversal film for professional use, the mode 2 or the mode 3 which designates the region may be selected (either by operator's selection or by automatic selection of an apparatus).

As described above, according to the present invention, a region to which the dodging processing is applied and a region where the intensity of the dodging processing applied is changed are interactively designated by executing switching between the mode in which the dodging processing is applied to entire images, the mode in which the dodging processing is applied only to a designated region and the mode in which the dodging processing is applied to a designated region and the regions other than the designated region by changing the intensity of it. As a result, it has become possible to simply carry out the dodging processing only to a designated region or to a designated region by changing the intensity of it.

While the image processing apparatus of the present invention has been described above in detail, the present invention is by no means limited to the above embodiment and it goes without saying that various improvements and modifications can be made within the range which does not depart from the gist of the invention.

As described above in detail, according to the present invention, the image processing apparatus of the present invention includes the mode in which the dodging processing is applied to entire images, the mode in which the dodging processing is applied only to a designated region, and the like, interactively designates a region to which the dodging processing is applied and a region to which the dodging processing is applied in high intensity. Accordingly, the image processing apparatus can simply apply the dodging processing and the dodging processing having high intensity only to the designated region, whereby finished prints to which gradation processing is more appropriately applied can be obtained.

What is claimed is:

1. An image processing apparatus for receiving image data from an image data supply source and converting the image data into output image data by subjecting the image data to image processing, comprising:

first dodging processing means for applying automatic dodging processing to an entire image of one frame;

means for interactively instructing a region from an image of said one frame; and second dodging processing means for applying the automatic dodging processing only to the instructed region.

2. The image processing apparatus according to claim 1, wherein said first dodging processing means applies said automatic dodging processing in uniform intensity.

3. The image processing apparatus according to claim 1, wherein the image processing apparatus includes, as an automatic dodging processing mode, a mode in which the automatic dodging processing is applied to the entire image by said first dodging processing means and a mode in which the automatic dodging processing is applied only to the instructed region by said second dodging processing means, the mode in which the automatic dodging processing is applied to the entire image is set as a basic mode, and the image processing apparatus further comprises switching means for switching the modes from the basic mode to the mode in which the automatic dodging processing is applied only to the instructed region.

4. The image processing apparatus according to claim 1, wherein the automatic dodging processing compresses a dynamic range of the image by compressing a low frequency component of the image data of a region to be processed and said first and second dodging processing means have means for compressing the low frequency component commonly used in both of said first and second dodging processing means.

5. The image processing apparatus according to claim 1, wherein:

said first dodging processing means has first compressing means for compressing a low frequency component of the image data of the entire image to apply the automatic dodging processing, said second dodging processing means has second compressing means for compressing the low frequency component by weighting the low frequency component with a signal for instructing the region due to said instructing means, and said first and second compressing means are commonly used.

6. The image processing apparatus according to claim 1, wherein a signal for instructing the regions can be input externally by said instructing means.

7. An image processing apparatus for receiving image data from an image data supply source and converting the image data into output image data by subjecting the image data to image processing, comprising:

first dodging processing means for applying automatic dodging processing to an entire image of one frame;

means for interactively instructing a region from an image of said one frame; and third dodging processing means for applying the automatic dodging processing to the instructed region and to the regions other than the instructed region in different intensity.

8. The image processing apparatus according to claim 7, wherein said first dodging processing means applies said automatic dodging processing in uniform intensity.

9. The image processing apparatus according to claim 7, wherein the image processing apparatus includes, as an automatic dodging mode, a mode in which the automatic dodging processing is applied to the entire image in uniform intensity by said first dodging processing means and a mode in which the automatic dodging processing is applied to the instructed region and to the regions other than the instructed region in different intensity by said third dodging processing means, the mode in which the automatic dodging processing is applied to the entire image is set as a basic mode, and the image processing apparatus further comprises switching means for executing switching from the basic mode to the mode in which the dodging processing is applied to the instructed region and to the regions other than the instructed region in different intensity.

10. The image processing apparatus according to claim 7, wherein the automatic dodging processing compresses a dynamic range of the image by compressing a low frequency component of the image data of a region to be processed and said first and Cthira dodging processing means have means for compressing the low frequency component commonly used in both of said first and third dodging processing means.

11. The image processing apparatus according to claim 7, wherein a signal for instructing the regions can be input externally by said instructing means.

12. An image processing apparatus for receiving image data from an image data supply source and converting the image data into output image data by subjecting the image data to image processing, comprising:

first dodging processing means for applying automatic dodging processing to an entire image of one frame;

means for interactively instructing a region from an image of said one frame;

second dodging processing means for applying the automatic dodging processing only to the instructed region; and third dodging processing means for applying the automatic dodging processing to the instructed region and to the regions other than the instructed region in different intensity.

13. The image processing apparatus according to claim 12, wherein said first dodging processing means applies said automatic dodging processing in uniform intensity.

14. The image processing apparatus according to claim 12, wherein the image processing apparatus includes, as an automatic dodging processing mode, a mode in which the automatic dodging processing is applied to the entire image in uniform intensity by said first dodging processing means, a mode in which the automatic dodging processing is applied only to the instructed region by said second dodging processing means and a mode in which the automatic dodging processing is applied to the instructed region and to the regions other than the instructed region in different intensity by said third dodging processing means, the mode in which the automatic dodging processing is applied to the entire image is set as a basic mode, and the image processing apparatus further comprises switching means for switching the modes from the basic mode to any of the mode in which the automatic dodging processing is applied only to the instructed region and the mode in which the automatic dodging processing is applied to the instructed region and to the regions other than the instructed region in different intensity.

15. The image processing apparatus according to claim 12, wherein the automatic dodging processing compresses a dynamic range of the image by compressing a low frequency component of the image data of a region to be processed and said first, second and third dodging processing means have means for compressing the low frequency component is commonly used in said first, second and third dodging processing means.

16. The image processing apparatus according to claim 12, wherein a signal for instructing the regions can be input externally by said instructing means.

* * * * *

UNITED STATES PATENT AND TRADEMARK OFFICE
CERTIFICATE OF CORRECTION

PATENT NO. : 6,700,685 B1
DATED : March 2, 2004
INVENTOR(S) : Toru Matama

It is certified that error appears in the above-identified patent and that said Letters Patent is hereby corrected as shown below:

Column 16,
Line 46, please replace "Cthira" with -- third --.

Signed and Sealed this

Seventh Day of September, 2004

JON W. DUDAS
*Director of the United States Patent and Trademark Office*